US012249784B2

(12) United States Patent
Horiguchi et al.

(10) Patent No.: US 12,249,784 B2
(45) Date of Patent: Mar. 11, 2025

(54) CONNECTOR INCLUDING RECESS FOR RECEIVING PROTRUSION OF MATING HOUSING

(71) Applicant: SUMITOMO WIRING SYSTEMS, LTD., Mie (JP)

(72) Inventors: Yuki Horiguchi, Mie (JP); Ryousuke Giga, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 362 days.

(21) Appl. No.: 17/790,331

(22) PCT Filed: Dec. 24, 2020

(86) PCT No.: PCT/JP2020/048383
§ 371 (c)(1),
(2) Date: Jun. 30, 2022

(87) PCT Pub. No.: WO2021/145187
PCT Pub. Date: Jul. 22, 2021

(65) Prior Publication Data

US 2023/0039983 A1 Feb. 9, 2023

(30) Foreign Application Priority Data

Jan. 13, 2020 (JP) ................................ 2020-003304

(51) Int. Cl.
*H01R 13/40* (2006.01)
*H01R 13/506* (2006.01)

(52) U.S. Cl.
CPC .................................. *H01R 13/506* (2013.01)

(58) Field of Classification Search
CPC .................................................. H01R 13/506
(Continued)

(56) References Cited

U.S. PATENT DOCUMENTS 5,123,866 A * 6/1992 Endo .................. H01R 13/4368 439/752
6,004,158 A * 12/1999 Ward ................. H01R 13/6215 439/752
(Continued)

FOREIGN PATENT DOCUMENTS

JP 2001-351721 A 12/2001
JP 2005-322487 A 11/2005
(Continued)

OTHER PUBLICATIONS

International Search Report issued on Mar. 30, 2021 for WO 2021/145187 A1 (4 pages).

*Primary Examiner* — Abdullah A Riyami
*Assistant Examiner* — Vladimir Imas
(74) *Attorney, Agent, or Firm* — Venjuris, P.C.

(57) ABSTRACT

It is aimed to provide a connector having good space efficiency. A connector is provided with a first housing having a first facing surface and a first lock portion, and a second housing having a second facing surface and a second lock portion. The first lock portion and the second lock portion are respectively arranged in a rear part of the first facing surface and a rear part of the second facing surface. The first housing and the second housing include a recess for receiving a protrusion provided in a mating housing as a connection partner in a combined state. The recess is arranged between a front part of the first facing surface and a front part of the second facing surface and forward of a locked part of the first lock portion and the second lock portion.

4 Claims, 9 Drawing Sheets

(58) Field of Classification Search
USPC .......................................................... 439/625
See application file for complete search history.

(56) References Cited

U.S. PATENT DOCUMENTS

| | | | | |
|---|---|---|---|---|
| 6,343,952 | B1 * | 2/2002 | Fukuda | H01R 13/5208 439/587 |
| 6,435,894 | B2 * | 8/2002 | Little | H01R 13/639 439/352 |
| 8,636,536 | B2 * | 1/2014 | Suemitsu | H01R 13/4361 439/752 |
| 9,722,347 | B2 * | 8/2017 | Chikusa | H01R 24/28 |
| 10,944,199 | B2 * | 3/2021 | Matsuura | H01R 13/629 |
| 2010/0007259 | A1 * | 1/2010 | Kaneko | H10K 59/8794 313/45 |
| 2011/0009016 | A1 * | 1/2011 | Liu | H01R 13/6215 439/892 |

FOREIGN PATENT DOCUMENTS

| | | |
|---|---|---|
| JP | 2007-026706 A | 2/2007 |
| JP | 2008-177076 A | 7/2008 |
| JP | 2015-035404 A | 2/2015 |

* cited by examiner

CONNECTOR INCLUDING RECESS FOR RECEIVING PROTRUSION OF MATING HOUSING

CROSS REFERENCE TO RELATED APPLICATIONS

This application is a national phase of PCT application No. PCT/JP2020/048383, filed on 24 Dec. 2020, which claims priority from Japanese patent application No. 2020-003304, filed on 13 Jan. 2020, all of which are incorporated herein by reference.

TECHNICAL FIELD

The present disclosure relates to a connector.

BACKGROUND

A connector disclosed in Patent Document 1 includes a first connector and a second connector to be held in a mutually combined state. The first connector includes an engagement receiving portion in a ceiling plate facing the second connector. The engagement receiving portion extends in a lateral direction, is open in both side plates and cuts an intermediate part in a front-rear direction of the ceiling plate. The second connector includes an engaging portion on a bottom plate facing the first connector. The engaging portion is slid and inserted into the engagement receiving portion in the lateral direction. In this way, the first and second connectors are held in a vertically stacked state. Note that a connector of this type called a combined connector or stack connector is also disclosed in Patent Document 2 and Patent Document 3.

PRIOR ART DOCUMENT

Patent Document

Patent Document 1: JP 2008-177076 A
Patent Document 2: JP 2001-351721 A
Patent Document 3: JP 2005-322487 A

SUMMARY OF THE INVENTION

Problems to be Solved

In the case of Patent Document 1, since the engagement receiving portion cuts the intermediate part in the front-rear direction of the ceiling plate, the strength of the first connector may be reduced. Further, an external matter may enter terminal accommodation chambers of the first connector through the engagement receiving portion. In contrast, if an engagement receiving portion is provided on the ceiling plate of the first connector, the ceiling plate needs not be cut. However, if the engagement receiving portion projects upward on the ceiling plate and the engaging portion projects downward on the bottom plate, gaps are formed between the ceiling plate and the bottom plate and forward and rearward of an engaged part of the engagement receiving portion and the engaging portion when the first and second connectors are in a combined state. Thus, there is a problem that the space efficiency of the first and second connectors in the combined state is deteriorated by the formed gaps.

Accordingly, the present disclosure aims to provide a connector having good space efficiency.

Means to Solve the Problem

The present disclosure is directed to a connector with a first housing having a first facing surface and a first lock portion, and a second housing having a second facing surface and a second lock portion, wherein the first facing surface and the second facing surface are arranged to face each other, the first lock portion and the second lock portion are respectively arranged in a rear part of the first facing surface and a rear part of the second facing surface and locked to each other to hold the first housing and the second housing in a combined state, the first housing and the second housing include a recess for receiving a protrusion provided in a mating housing as a connection partner in the combined state, and the recess is arranged between a front part of the first facing surface and a front part of the second facing surface and forward of a locked part of the first lock portion and the second lock portion.

Effect of the Invention

According to the present disclosure, it is possible to provide a connector having good space efficiency.

DETAILED DESCRIPTION TO EXECUTE THE INVENTION

Description of Embodiments of Present Disclosure

Figure 1:
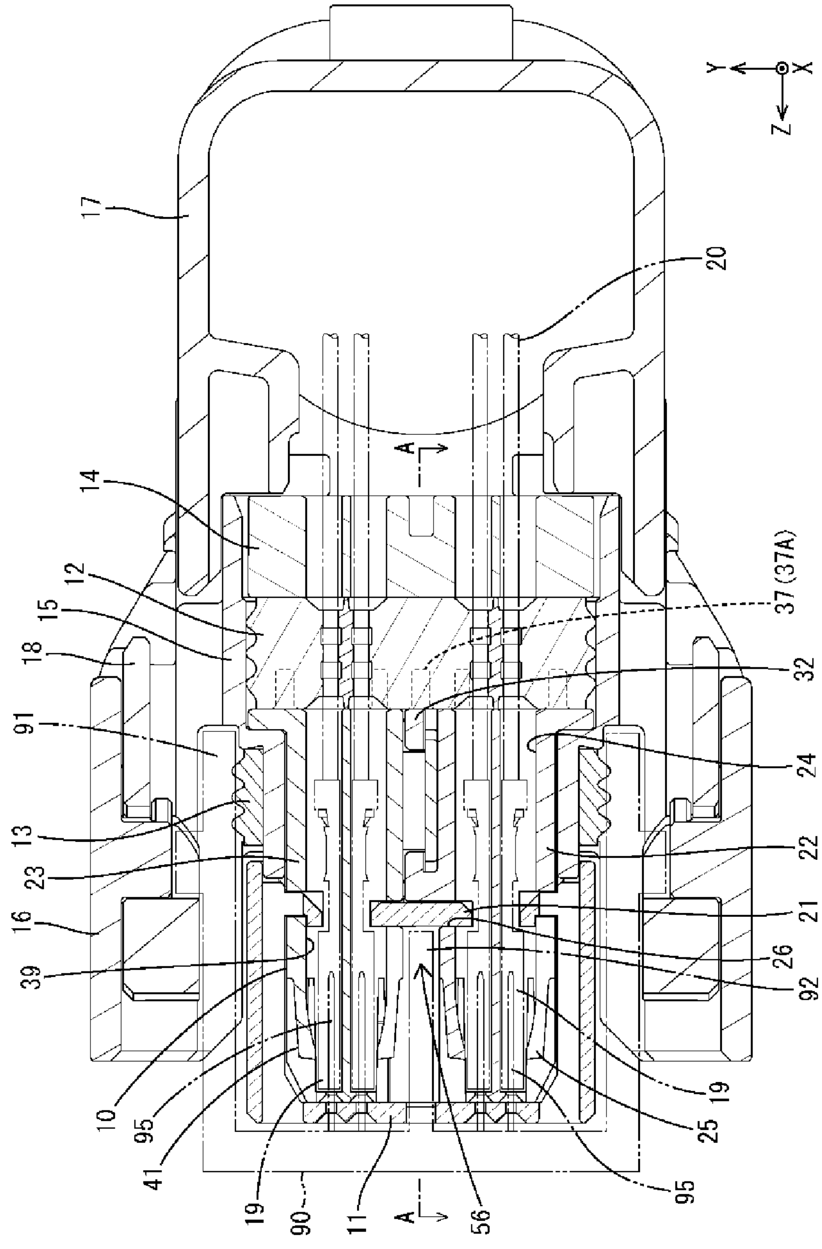
FIG. 1 is a side view in section of a connector according to an embodiment.

First, embodiments of the present disclosure are listed and described.

(1) The connector of the present disclosure is provided with a first housing having a first facing surface and a first lock portion, and a second housing having a second facing surface and a second lock portion, wherein the first facing surface and the second facing surface are arranged to face each other, the first lock portion and the second lock portion are respectively arranged in a rear part of the first facing surface and a rear part of the second facing surface and locked to each other to hold the first housing and the second housing in a combined state, the first housing and the second housing include a recess for receiving a protrusion provided in a mating housing as a connection partner in the combined state, and the recess is arranged between a front part of the first facing surface and a front part of the second facing surface and forward of a locked part of the first lock portion and the second lock portion.

When the first housing and the second housing are in the combined state, a gap is formed between the front part of the first facing surface and the front part of the second facing surface and forward of the locked part of the first lock portion and the second lock portion. However, this gap serves as the recess for receiving the protrusion provided in the mating housing as the connection partner. Thus, according to the above configuration, a space between the first facing surface and the second facing surface can be effectively utilized.

(2) Preferably, the recess receives a protrusion for preventing forced connection of the mating housing. The protrusion for preventing forced connection tends to be enlarged and the recess also tends to be enlarged. In that respect, according to the above configuration, since the recess is arranged between the front part of the first facing surface and the front part of the second facing surface, a large space can be secured along a plane direction of the first facing surface and the second facing surface. Therefore, the protrusion for preventing forced connection can be formed in large size in the plane direction of the first facing surface and the second facing surface.

(3) The first lock portion and the second lock portion may be slide locks for locking a movement along the plane direction of the first facing surface and the second facing surface. Since the first lock portion and the second lock portion are slide locks, positional deviations of the first housing and the second housing in the plane direction are prevented. Therefore, according to this embodiment, the shape of the recess can be stably maintained.

(4) At least one of the first housing and the second housing may include a projecting piece projecting rearward from a rear surface and the projecting piece is arranged in a positioning hole of a sealing member, and at least one of the first lock portion and the second lock portion may be arranged at a position continuous with a base of the projecting piece. Since the projecting piece is arranged in the positioning hole of the sealing member, the sealing member can be positioned and arranged on the rear surface side of at least one of the first housing and the second housing. Here, since the base of the projecting piece is arranged at the position continuous with at least one of the first lock portion and the second lock portion, space efficiency is improved.

Details of Embodiment of Present Disclosure

A specific example of a connector of the present disclosure is described below with reference to the drawings. Note that the present invention is not limited to these illustrations and is intended to be represented by claims and include all changes in the scope of claims and in the meaning and scope of equivalents.

<Overall Structure of Connector>

A connector according to an embodiment includes, as shown in FIG. 1, an inner housing 10, a front member 11, a sealing member 12, a sealing ring 13, a rear holder 14, an outer housing 15, an outer shell 16, a wire cover 17, a lever 18 and female terminal fittings 19. The inner housing 10, the front member 11, the rear holder 14, the outer housing 15, the outer shell 16, the wire cover 17 and the lever 18 are made of synthetic resin. The sealing member 12 and the sealing ring 13 are made of rubber. The terminal fittings 19 are made of conductive metal.

The front member 11 is arranged to cover the front surface of the inner housing 10. The front member 11 includes a retaining portion 21 for retaining the terminal fittings 19 in the inner housing 10. The sealing member 12 is a one-piece rubber plug and arranged to be sandwiched between the inner housing 10 and the rear holder 14. The sealing member 12 seals wires 20 connected to the terminal fittings 19 in a liquid-tight manner and seals the inside of the inner housing 10 in a liquid-tight manner. The wires 20 are arranged into the wire cover 17 from the rear holder 14 and drawn out to outside from the wire cover 17.

The outer housing 15 is arranged to surround the inner housing 10. The outer shell 16 constitutes a part outside the outer housing 15 and supports the lever 18. The lever 18 is rotated about a position supported by the outer shell 16 with the connector engaged with a mating housing 90. In this way, the connection of the connector and the mating housing 90 proceeds. The sealing ring 13 is arranged in close contact with the outer peripheral surface of the outer housing 15. The mating housing 90 is fit into between the outer shell 16 and a part inside the outer housing 15 from front. The connector and the mating housing 90 are sealed in a liquid-tight manner via the sealing ring 13. The inner housing 10 is composed of a first housing 22 and a second housing 23.

Each structure of the mating housing 90, the first housing 22 and the second housing 23 is specifically described below. Note that, in this specification, a direction in which a later-described first facing surface 27 of the first housing 22 and a later-described second facing surface 43 of the second housing 23 are facing each other is defined as an "up-down direction" and a "height direction". That is, the height direction is synonymous with the up-down direction. Further, a direction intersecting, more specifically orthogonal to, both the "front-rear direction" and the "up-down direction" is defined as a "width direction". Further, a direction orthogonal to the "up-down direction" is defined as a "plane direction". Further, in figures, a rightward direction along the width direction is defined as an "X direction", an upward direction is defined as a "Y direction" and a forward direction is defined as a "Z direction" when the connector is viewed from front. Note that, in this embodiment, a right side and a left side when the connector is viewed from front are equivalent to "one widthwise side" and the "other widthwise side.

<Mating Housing>

The mating housing 90 is made of synthetic resin and includes, as shown in FIG. 1, a receptacle 91 in the form of a rectangular tube. A plurality of male terminal fittings 95 are arranged to project into the receptacle 91. A protrusion 92 for preventing forced connection is arranged to project side by side with the male terminal fittings 95 in the receptacle 91. The protrusion 92 is in the form of a plate piece extending along the width direction and projects from the back wall of the receptacle 91. The protrusion 92 is arranged closer to one side from a widthwise central part in the receptacle 91. The tip of the protrusion 92 is arranged forward of the tips of the respective male terminal fittings 95. If an attempt is made to connect the inner housing 10 in a posture inclined with respect to the front-rear direction to the mating housing 90, the inner housing 10 abuts on the tip of the protrusion 92, thereby avoiding the abutment of the inner housing 10 on the tips of the male terminal fittings 95. In this way, the breakage and damage of the tips of the male terminal fittings 95 due to interference with the inner housing 10 are hindered.

<First Housing>

Figure 6:
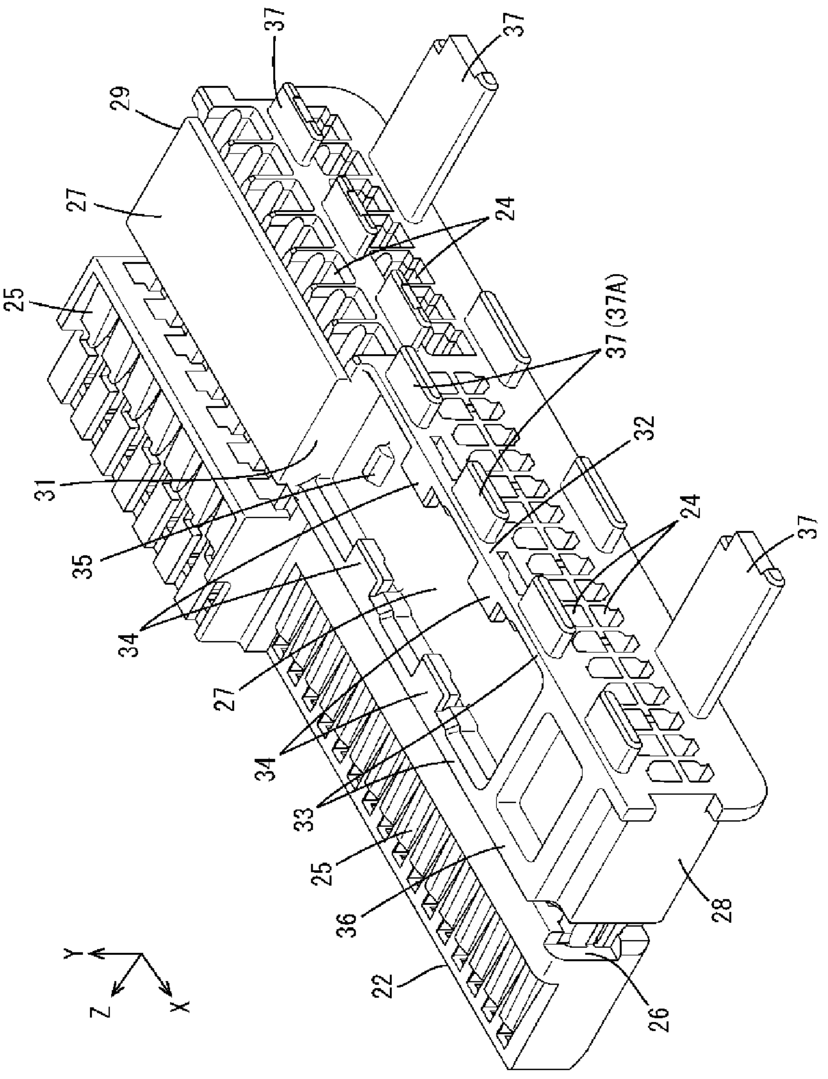
FIG. 6 is a perspective view of a first housing viewed from behind.

As shown in FIG. 6, the first housing 22 has a flat shape extending in the width direction as a whole. The first housing 22 is arranged below the second housing 23 in the inner housing 10.

The first housing 22 includes a plurality of first cavities 24 inside. Each first cavity 24 is provided to penetrate through the first housing 22 in the front-rear direction. As shown in FIG. 1, the first housing 22 includes first locking lances 25 projecting forward from the inner walls of the first cavities 24. The terminal fitting 19 is inserted into the first cavity 24 of the first housing 22 from behind. The terminal fitting 19 is locked by the first locking lance 25 and retained in the first cavity 24.

Figure 7:
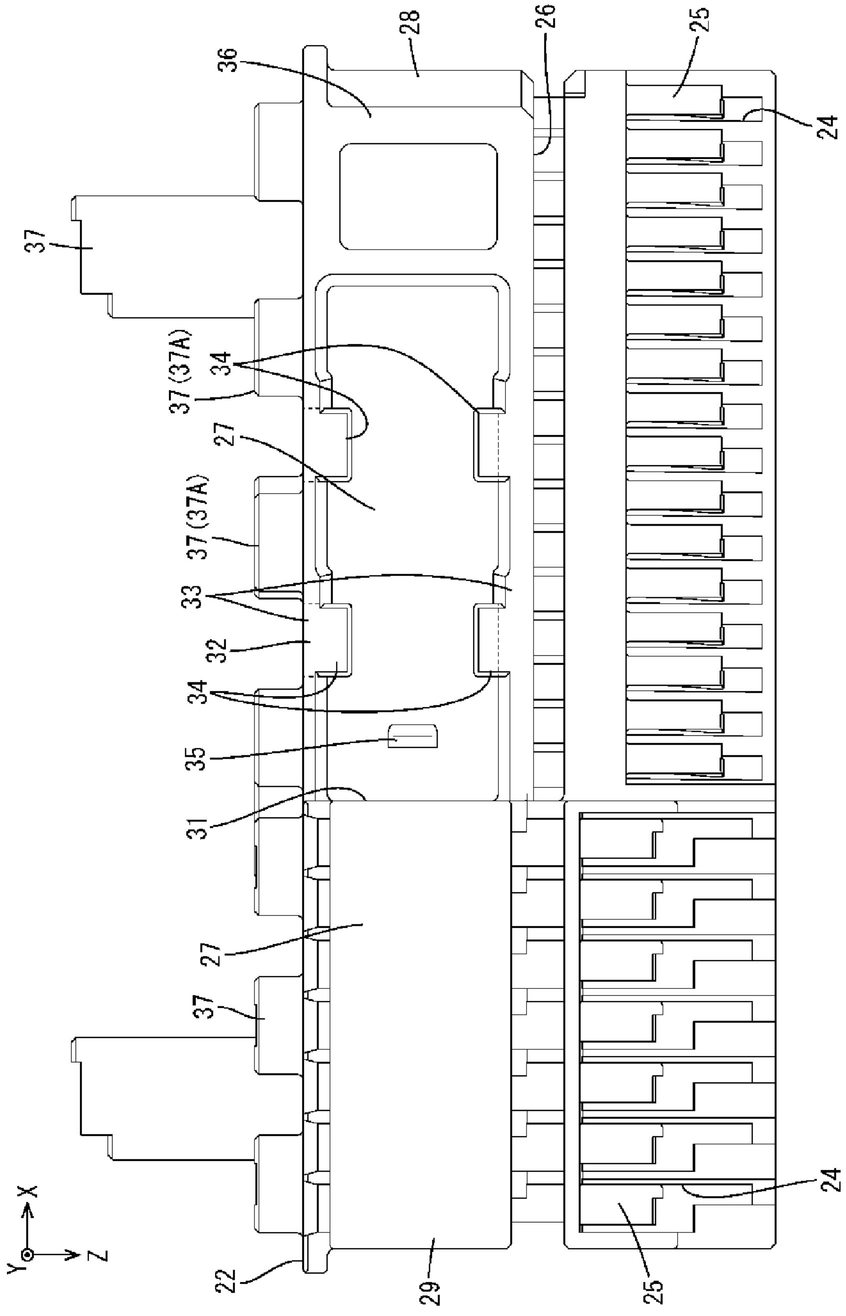
FIG. 7 is a plan view of the first housing.

As shown in FIGS. 6 and 7, a front part of the upper wall of the first housing 22 is cut. The respective first locking lances 25 are arranged in an exposed manner in the front part of the upper wall of the first housing 22. The first housing 22 includes a first slit groove 26 extending in the width direction between the front part and a rear part. The first slit groove 26 communicates with the respective first cavities 24. As shown in FIG. 1, the retaining portion 21 of the front member 11 is laterally inserted into the first slit groove 26.

As shown in FIG. 6, the upper surface of the first housing 22 is configured as the first facing surface 27 flat in the width direction. The respective first locking lances 25 are exposed in a front part of the first facing surface 27. The first slit groove 26 is open between the front part and a rear part of the first facing surface 27.

The first housing 22 includes a low-height portion 28 located on one widthwise side and a high-height portion 29 located on the other widthwise side and higher in height than the low-height portion 28. A first step 31 extending in the height direction is formed between the high-height portion 29 and the low-height portion 28. The low-height portion 28 and the high-height portion 29 are respectively configured to have different widths. Specifically, the width of the low-height portion 28 is larger than that of the high-height portion 29.

As shown in FIG. 6, a plurality of the first cavities 24 are arranged in the width direction in two upper and lower stages in each of the high-height portion 29 and the low-height portion 28. The respective first cavities 24 formed in the high-height portion 29 are configured to have a larger opening dimension than the respective first cavities 24 formed in the low-height portion 28. Out of the respective first cavities 24, those formed in the upper stage of the high-height portion 29 have parts overlapping the first step 31 in the up-down direction.

A first lock portion 32 projects on the first facing surface 27 in the rear part of the low-height portion 28. The first lock portion 32 includes front and rear guide ribs 33 respectively extending in parallel to the width direction, a pair of pressing portions 34 arranged at two intermediate positions spaced apart in the width direction on each of the guide ribs 33 and projecting inward to face the corresponding ones of the other guide rib 33, and a claw-like lock projection 35 projecting on the first facing surface 27 at a position in a central part in the width direction between the both guide ribs 33 and near the first step 31. As shown in FIG. 7, out of the both guide ribs 33, the front guide rib 33 is arranged adjacent to the first slit groove 26. The rear guide rib 33 is arranged along the rear end of the rear part of the low-height portion 28, i.e. along the rear end of the first housing 22. The other widthwise end of each guide rib 33 is connected to the first step 31. One widthwise end of each guide rib 33 is connected to a closing portion 36. The closing portion 36 is in the form of a rectangular frame and projects on the first facing surface 27 of the rear part of the low-height portion 28. The upper surfaces of the both guide ribs 33 and that of the closing portion 36 are continuous without any step. Projecting dimensions of the both guide ribs 33 and the closing portion 36 are larger than that of the lock projection 35 and smaller than a height of the first step 31. The height of the first step 31 is, in other words, a projecting dimension from the first facing surface 27.

Figure 2:
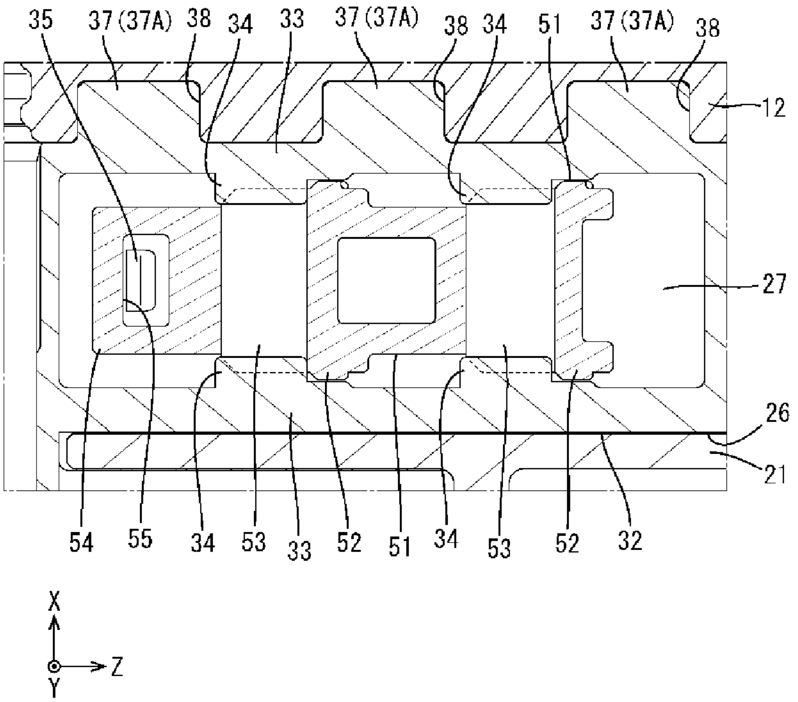
FIG. 2 is a section along A-A of FIG. 1 of a locked part of a first lock portion and a second lock portion.

The first housing 22 includes a plurality of projecting pieces 37 projecting rearward from a rear surface. Each projecting piece 37 is in the form of a plate piece extending along the width direction. The respective projecting pieces 37 include a plurality of lock portion coupling projecting pieces 37A connected to the rear guide rib 33 in an upper part of the rear surface of the low-height portion 28. As shown in FIG. 2, the plurality of lock portion coupling projecting pieces 37A are arranged at intervals in the width direction with bases thereof, i.e. base ends thereof in a projecting direction coupled to the rear guide rib 33. The respective lock portion coupling projecting pieces 37A and the respective pressing portions 34 are alternately arranged in the width direction. The respective projecting pieces 37 are positioned and inserted into positioning holes 38 provided in the sealing member 12. The sealing member 12 is positioned and arranged on the rear surface side of the first housing 22 by the respective projecting pieces 37. As shown in FIG. 6, the first facing surface 27 of the high-height portion 29 is arranged at a position higher than the first facing surface 27 of the low-height portion 28 via the first step 31. The first facing surface 27 in the rear part of the high-height portion 29 is formed flat as a whole and has no irregularities.

<Second Housing>

Figure 8:
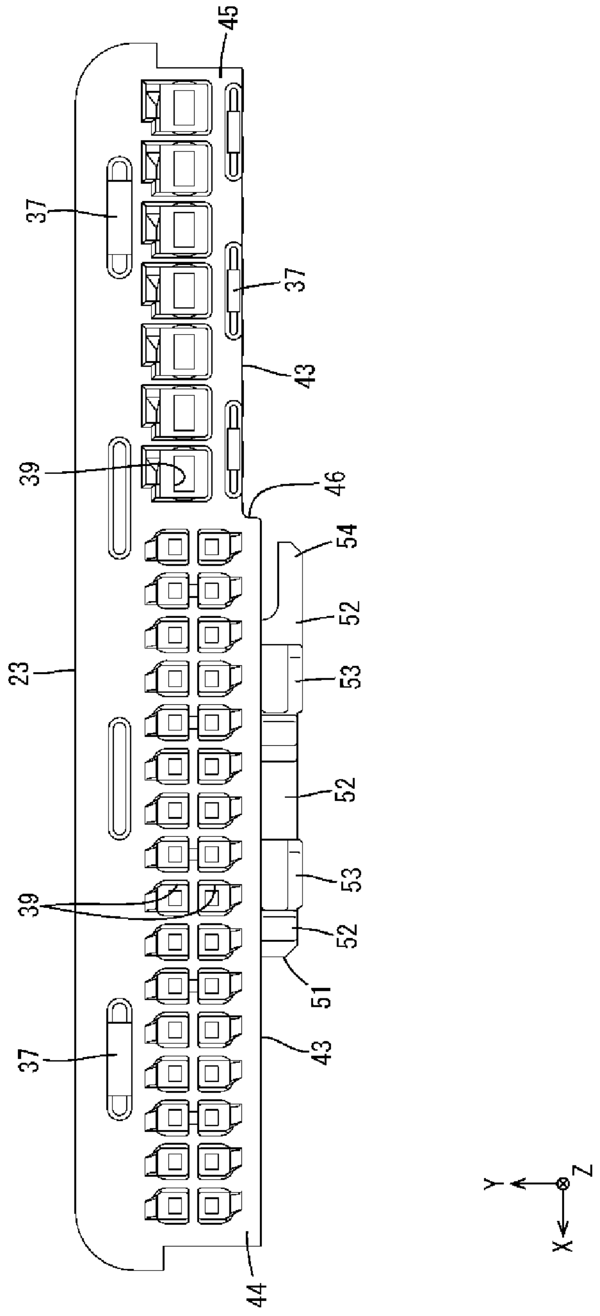
FIG. 8 is a back view of a second housing.
Figure 9:
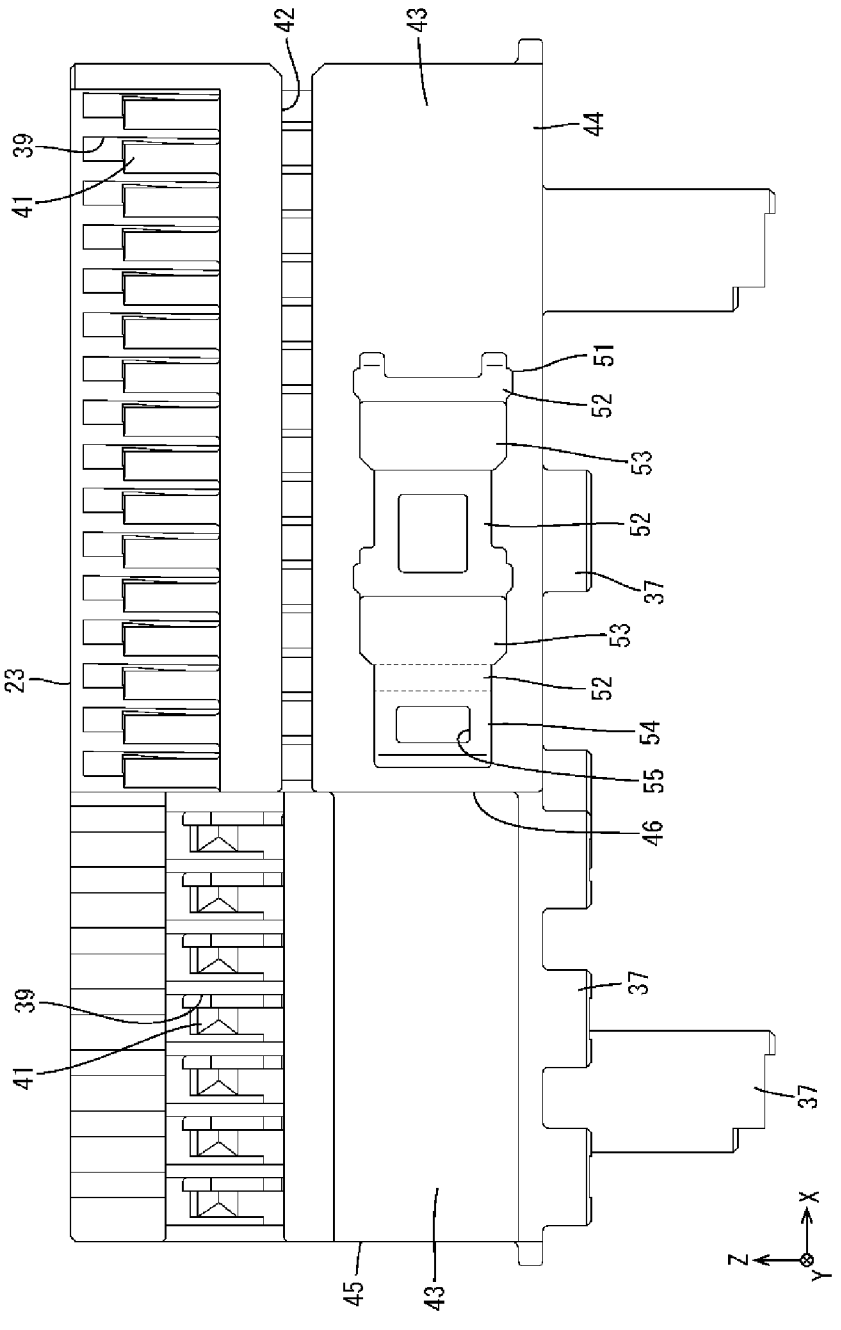
FIG. 9 is a bottom view of the second housing.

As shown in FIGS. 8 and 9, the second housing 23 has a flat shape extending in the width direction as a whole. The second housing 23 is arranged above the first housing 22 in the inner housing 10.

The second housing 23 includes a plurality of second cavities 39 inside. Each second cavity 39 is provided to penetrate through the second housing 23 in the front-rear direction. As shown in FIG. 1, the second housing 23 includes second locking lances 41 projecting forward from the inner walls of the second cavities 39. The terminal fitting 19 is inserted into the second cavity 39 of the second housing 23 from behind. The terminal fitting 19 is locked by the second locking lance 41 and retained in the second cavity 39.

As shown in FIG. 9, a front part of the lower wall of the second housing 23 is cut. The respective second locking lances 41 are arranged in an exposed manner in the front part of the lower wall of the second housing 23. The second housing 23 includes a second slit groove 42 extending in the width direction between the front part and a rear part. The second slit groove 42 communicates with the respective second cavities 39. The retaining portion 21 of the front member 11 is laterally inserted into the second slit groove 42.

The lower surface of the second housing 23 is configured as the second facing surface 43 flat in the width direction. The respective second locking lances 41 are exposed in a front part of the second facing surface 43. The second slit groove 42 is open between the front part and a rear part of the second facing surface 43.

Figure 4:
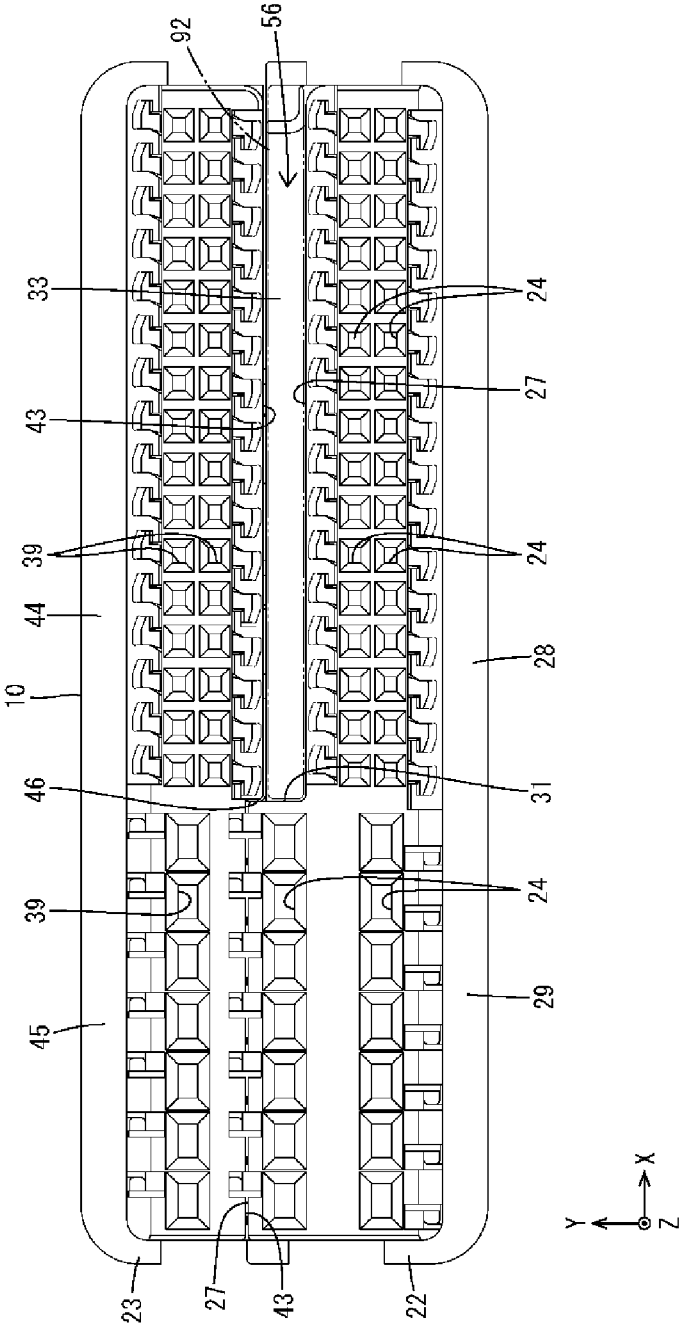
FIG. 4 is a front view of the inner housing.

As shown in FIG. 8, the second housing 23 includes a one-side facing portion 44 located on one widthwise side and an other-side facing portion 45 located on the other widthwise side and having a smaller vertical dimension than the one-side facing portion 44. A second step 46 extending in the height direction is formed between the one-side facing portion 44 and the other-side facing portion 45. As shown in FIG. 4, the one-side facing portion 44 is arranged to face the low-height portion 28 from above in the inner housing 10. The other-side facing portion 45 is arranged to face the high-height portion 29 from above in the inner housing 10. The one-side facing portion 44 has a width corresponding to the low-height portion 28 and the other-side facing portion 45 has a width corresponding to the high-height portion 29. The second step 46 has a smaller height than the first step 31.

As shown in FIG. 8, a plurality of the second cavities 39 are arranged in the width direction in two upper and lower stages in the one-side facing portion 44, and a plurality of the second cavities 39 are arranged in a row in the width direction in the other-side facing portion 45. The respective second cavities 39 formed in the other-side facing portion 45 are configured to have a larger opening dimension than the respective second cavities 39 formed in the one-side facing portion 44.

As shown in FIGS. 8 and 9, a second lock portion 51 projects on the second facing surface 43 in the rear part of the one-side facing portion 44. The second lock portion 51 includes base portions 52 projecting at three positions spaced apart in the width direction on the second facing surface 43, a pair of pressed portions 53 extending between the base portions 52 adjacent in the width direction, and a lock piece 54 cantilevered toward the other side from the base portion 52 located on the other widthwise side. The both pressed portions 53 and the lock piece 54 are arranged to face the second facing surface 43 in the rear part of the one-side facing portion 44 while being spaced apart. The lock piece 54 includes a rectangular lock hole 55 open in a central part. The lock piece 54 is vertically deflectable and deformable with a part coupled to the base portion 52 located on the other widthwise side as a fulcrum. The base portion 52 located on a widthwise central side is in the form of a rectangular frame.

The second housing 23 includes a plurality of projecting pieces 37 projecting rearward from a rear surface and positioned and arranged in the positioning holes 38 of the sealing member 12, similarly to the first housing 22. The respective projecting pieces 37 are arranged side by side in the width direction in an upper part of the rear surface of the second housing 23.

As shown in FIG. 8, the second facing surface 43 of the other-side facing portion 45 is arranged at a position higher than the second facing surface 43 of the one-side facing portion 44 via the second step 46. As shown in FIG. 9, the second facing surface 43 of the other-side facing portion 45 is formed flat as a whole and has no irregularities.

<Structure and Functions of Inner Housing>

In assembling, the second housing 23 is lowered to the first housing 22 from above. Then, the second facing surface 43 in the rear part of the one-side facing portion 44 is arranged to abut on the upper surfaces of the both guide ribs 33 and the upper surface of the closing portion 36, the lower surface of the second lock portion 51 is arranged to abut on the first facing surface 27 in the rear part of the low-height portion 28, and the second facing surface 43 of the other-side facing portion 45 is arranged to abut on the first facing surface 27 of the high-height portion 29. At this time, the lock piece 54 is adjacent to the lock projection 35 on the one widthwise side, and the second housing 23 is positionally deviated toward the one widthwise side from a proper assembly position with respect to the first housing 22.

Subsequently, the second housing 23 is slid and moved to the other widthwise side with respect to the first housing 22. In the process of moving the second housing 23, the second facing surface 43 in the rear part of the one-side facing portion 44 slides on the upper surfaces of the both guide ribs 33 and the like, the lower surface of the second lock portion 51 slides on the first facing surface 27 in the rear part of the low-height portion 28, and the second facing surface 43 of the other-side facing portion 45 slides on the first facing surface 27 of the high-height portion 29. Further, in the process of moving the second housing 23, front and rear end parts of the respective pressed portions 53 slip under the respective pressing portions 34 and, further, the lock piece 54 is deflected and deformed upward by interfering with the lock projection 35. Thereafter, the lock piece 54 is resiliently restored and, as shown in FIG. 2, the lock projection 35 is fit into the lock hole 55 of the lock piece 54. Then, the second step 46 of the second housing 23 butts against the first step 31 of the first housing 22 and the movement of the second housing 23 is stopped. The lock piece 54 locks the lock projection 35, whereby a positional deviation in the width direction of the second housing 23 with respect to the first housing 22 is restricted. Further, by the abutment of the front and rear end parts of the respective pressed portions 53 on the lower surfaces of the respective pressing portions 34, the second housing 23 is restricted from being displaced in a direction away from the first housing 22.

Figure 3:
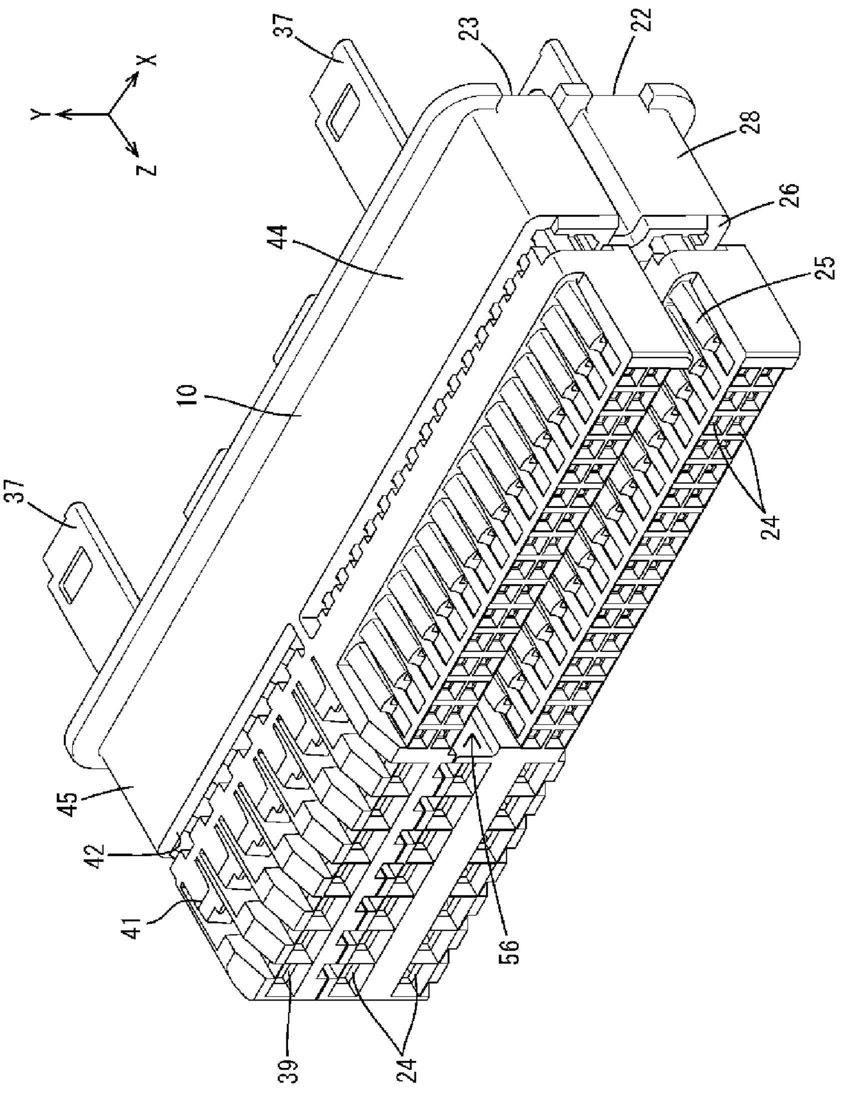
FIG. 3 is a perspective view of an inner housing viewed from front.
Figure 5:
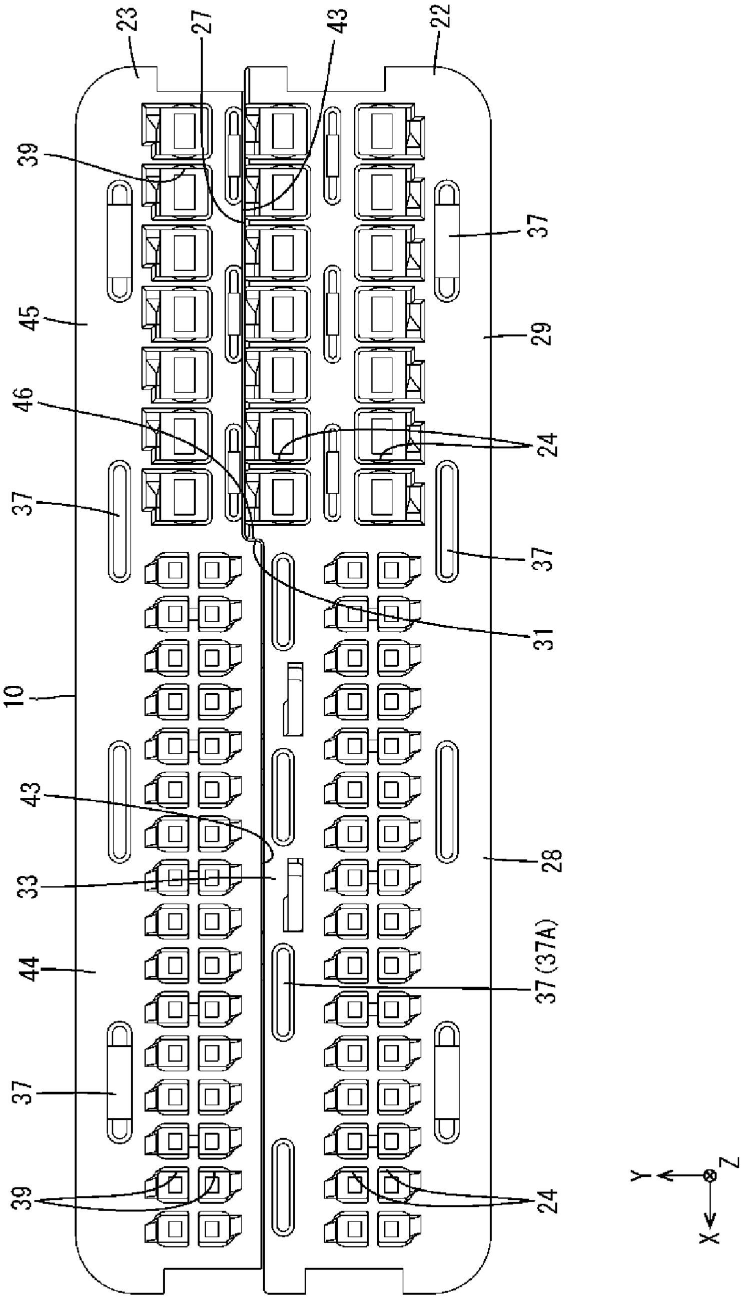
FIG. 5 is a back view of the inner housing.

In the above way, the second housing 23 is properly assembled with the first housing 22 and, as shown in FIG. 3, the inner housing 10 is formed in which the first and second housings 22, 23 are held in the combined state. As shown in FIG. 5, if the inner housing 10 is viewed from behind, the second facing surface 43 of the other-side facing portion 45 is in contact with the first facing surface 27 of the high-height portion 29 and the first and second steps 31, 46 are in contact with each other in the width direction on the other widthwise side, and the second facing surface 43 in the rear part of the one-side facing portion 44 is in contact with the upper surface of the rear guide rib 33 on the one widthwise side. Thus, the first and second housings 22, 23 are in contact without any gap at a boundary thereof on the rear surface of the inner housing 10.

On the other hand, as shown in FIG. 4, if the inner housing 10 is viewed from front, the second facing surface 43 of the other-side facing portion 45 is in contact with the first facing surface 27 of the high-height portion 29 on the other widthwise side, but a gap is formed in the up-down direction between the first facing surface 27 in the front part of the low-height portion 28 and the second facing surface 43 in the front part of the one-side facing portion 44. The first facing surface 27 in the front part of the low-height portion 28 and the second facing surface 43 in the front part of the one-side facing portion 44 are arranged to face in parallel to each other via the gap.

Here, a recess 56 is formed to be open between the first and second facing surfaces 27 and 43 on the one widthwise side of the front surface of the inner housing 10. The back surface of the recess 56 is defined by the front guide rib 33 of the first lock portion 32. One widthwise end of the recess 56 is open in one side surface of the inner housing 10. The other widthwise end of the recess 56 is defined by the first step 31. The upper surface of the recess 56 is defined by the second facing surface 43 in the front part of the one-side facing portion 44. The lower surface of the recess 56 is defined by the first facing surface 27 in the front part of the low-height portion 28. In short, the recess 56 is formed into a slit groove long in the width direction.

With the connector connected to the mating housing 90, the protrusion 92 for preventing forced connection is arranged to enter the recess 56 via a hole part of the front member 11. In this way, the upper surface of the protrusion 92 is arranged to contactably face the second facing surface

43 in the front part of the one-side facing portion 44. The lower surface of the protrusion 92 is arranged to contactably face the first facing surface 27 in the front part of the low-height portion 28. The recess 56 is filled by the protrusion 92.

As just described, according to this embodiment, the first and second lock portions 32, 51 are respectively arranged in the rear part of the first facing surface 27 and the rear part of the second facing surface 43, the first and second housings 22, 23 include the recess 56 for receiving the protrusion 92 of the mating housing 90 in the inner housing 10 in the combined state, and the recess 56 is arranged between the front part of the first facing surface 27 and the front part of the second facing surface 43 and forward of the locked part of the first and second lock portions 32, 51. Thus, the recess 56 formed forward of the locked part of the first and second lock portions 32, 51 is used as a part for receiving the protrusion 92. Therefore, a space between the first facing surface 27 of the first housing 22 and the second facing surface 43 of the second housing 23 is effectively utilized.

Further, in the case of this embodiment, the protrusion 92 for preventing forced connection is arranged along a plane direction of the first and second surfaces 27, 43, more specifically along the width direction, and the enlargement of the protrusion 92 in the width direction can be coped with.

Furthermore, the first and second housings 22, 23 include the plurality of projecting pieces 37, the respective projecting pieces 37 are arranged in the positioning holes 38 of the sealing member 12, and the first lock portion 32 is arranged at a position continuous with the bases of the lock portion coupling projecting pieces 37A, out of the respective projecting pieces 37. Thus, space efficiency is improved and, in addition, the strength of the first lock portion 32 and the projecting pieces 37 can be enhanced.

Other Embodiments

The embodiment disclosed this time should be considered illustrative in all aspects, rather than restrictive.

Although the first and second lock portions are slide locks in the case of the above embodiment, the first and second lock portions may be resilient locks having locking mechanisms resilient in a separating direction of the first and second housings as another embodiment.

Although the first lock portion is arranged at the position continuous with the bases of the lock portion coupling projecting pieces in the case of the above embodiment, the second lock portion may be arranged at the position continuous with the bases of the lock portion coupling projecting pieces as another embodiment. Alternatively, both the first and second lock portions may be arranged at positions continuous with the bases of the lock portion coupling projecting pieces.

When the connector is in use, the front-rear direction may be inclined with respect to a horizontal direction or may be parallel to a vertical direction. Further, the up-down direction may be inclined with respect to the vertical direction or may be parallel to the horizontal direction.

LIST OF REFERENCE NUMERALS

10 . . . inner housing
11 . . . front member
12 . . . sealing member
13 . . . sealing ring
14 . . . rear holder
15 . . . outer housing
16 . . . outer shell
17 . . . wire cover
18 . . . lever
19 . . . terminal fitting
20 . . . wire
21 . . . retaining portion
22 . . . first housing
23 . . . second housing
24 . . . first cavity
25 . . . first locking lance
26 . . . first slit groove
27 . . . first facing surface
28 . . . low-height portion
29 . . . high-height portion
31 . . . first step
32 . . . first lock portion
33 . . . guide rib
34 . . . pressing portion
35 . . . lock projection
36 . . . closing portion
37 . . . projecting piece
37A . . . lock portion coupling projecting piece
38 . . . positioning hole
39 . . . second cavity
41 . . . second locking lance
42 . . . second slit groove
43 . . . second facing surface
44 . . . one-side facing portion
45 . . . other-side facing portion
46 . . . second step
51 . . . second lock portion
52 . . . base portion
53 . . . pressed portion
54 . . . lock piece
55 . . . lock hole
56 . . . recess
90 . . . mating housing
91 . . . receptacle
92 . . . protrusion
95 . . . male terminal fitting

What is claimed is:

1. A connector, comprising:

a first housing having a first facing surface and a first lock portion; and a second housing having a second facing surface and a second lock portion, wherein:

the first facing surface and the second facing surface are arranged to face each other, the first lock portion and the second lock portion are respectively arranged in a rear part of the first facing surface and a rear part of the second facing surface and locked to each other to hold the first housing and the second housing in a combined state, the first housing and the second housing include a recess for receiving a protrusion provided in a mating housing as a connection partner in the combined state, and the recess is arranged between a front part of the first facing surface and a front part of the second facing surface and forward of a locked part of the first lock portion and the second lock portion.

2. The connector according to claim 1, wherein the recess receives a protrusion for preventing forced connection of the mating housing.

3. The connector according to claim 1, wherein the first lock portion and the second lock portion are slide locks for locking a movement along a plane direction of the first facing surface and the second facing surface.

4. The connector according to claim 1, wherein:

at least one of the first housing and the second housing includes a projecting piece projecting rearward from a rear surface and the projecting piece is arranged in a positioning hole of a sealing member, and at least one of the first lock portion and the second lock portion is arranged at a position continuous with a base of the projecting piece.

* * * * *